(12) United States Patent
Kumar et al.

(10) Patent No.: US 11,933,685 B2
(45) Date of Patent: Mar. 19, 2024

(54) HAZARDOUS LOCATION ELECTRICAL ENCLOSURE CORROSION MONITORING SYSTEM, ASSEMBLY AND METHOD

(71) Applicant: Eaton Intelligent Power Limited, Dublin (IE)

(72) Inventors: Shubham Kumar, Madhya Pradesh (IN); Vikas Pandey, Kharadi Pune (IN); Graig E. DeCarr, Cicero, NY (US)

(73) Assignee: Eaton Intelligent Power Limited, Dublin (IE)

( * ) Notice: Subject to any disclaimer, the term of this patent is extended or adjusted under 35 U.S.C. 154(b) by 252 days.

(21) Appl. No.: 17/407,659

(22) Filed: Aug. 20, 2021

(65) Prior Publication Data
US 2022/0057279 A1   Feb. 24, 2022

Related U.S. Application Data

(60) Provisional application No. 63/069,359, filed on Aug. 24, 2020.

(51) Int. Cl.
*G01L 1/24* (2006.01)
*G01K 11/3206* (2021.01)
(Continued)

(52) U.S. Cl.
CPC .......... *G01L 1/246* (2013.01); *G01K 11/3206* (2013.01); *G01M 3/38* (2013.01); *G08B 21/182* (2013.01)

(58) Field of Classification Search
None
See application file for complete search history.

(56) References Cited

U.S. PATENT DOCUMENTS 10,295,439 B2   5/2019   Manahan et al.
2006/0165344 A1*  7/2006  Mendez ............... G01L 11/025
                                                          385/13
(Continued)

FOREIGN PATENT DOCUMENTS

CA     3040494 A1 * 10/2019  ............. B64C 11/20
EP     2065551 A2 *  6/2009  ............. E21B 17/01
(Continued)

OTHER PUBLICATIONS

W.-P. Chen, F.-H. Shih, P.-J. Tseng, C.-H. Shao and C.-C. Chiang, "Application of a Packaged Fiber Bragg Grating Sensor to Outdoor Optical Fiber Cabinets for Environmental Monitoring," in IEEE Sensors Journal, vol. 15, No. 2, pp. 734-741, Feb. 2015, doi: 10.1109/JSEN.2014.2353040. (Year: 2015).*

(Continued)

*Primary Examiner* — Matthew G Marini
(74) *Attorney, Agent, or Firm* — Merchant & Gould P.C.

(57) ABSTRACT

A method of monitoring corrosion of an electrical enclosure in a hazardous environment is provided. The method is implemented with at least one computing device in communication with at least one FBG optical sensor reflecting UV light in the electrical enclosure. The method includes measuring wavelength changes of UV light reflected by the at least one sensor, wherein the wavelength changes are a function of corrosion-related strain in the electrical enclosure. The method also includes computing, by the at least one computing device, the corrosion-related strain in the electrical enclosure based on the measured wavelength changes. The method further includes comparing, by the at least one computing device, the computed corrosion-related strain with a predetermined threshold, and recommending preventive corrosion-related maintenance based on the comparison.

19 Claims, 5 Drawing Sheets

(51) Int. Cl.
*G01M 3/38* (2006.01)
*G08B 21/18* (2006.01)

(56) References Cited

U.S. PATENT DOCUMENTS

2009/0074348 A1* 3/2009 Xia .................... G01K 11/3206
385/12
2010/0021106 A1 1/2010 Tam et al.

FOREIGN PATENT DOCUMENTS

WO WO-2018134617 A1 * 7/2018 ......... G01K 11/3206
WO 2019123492 A1 6/2019

OTHER PUBLICATIONS

Ma Jun et al. "Corrosion monitoring and evaluation of steel strand for transmission line based on fiber Bragg grating (FBG)", SPIE Proceedings; [Proceedings of SPIE ISSN 0277-786X], SPIE, US, vol. 11382, Apr. 22, 2020, pp. 1138211-1138211, XP060132174, DOI: 10.1117/12.2558517, ISBN:978-1-5106-3673-6.
Al Handawi Khalil et al. : "Strain based FBG sensor for real-time corrosion rate monitoring in pre-stressed structures", Sensors and Actuators B: Chemical, Elsevier BV, NL, vol. 236, Jun. 2, 2016, pp. 276-285, XP029700080, ISSN: 0925-4005, DOI:10.1016/J. SNB. 2016.05.167.
Extended European Search Report for European Application No. 21192461.8, dated Jan. 21, 2022, 9 pages.

* cited by examiner

HAZARDOUS LOCATION ELECTRICAL ENCLOSURE CORROSION MONITORING SYSTEM, ASSEMBLY AND METHOD

CROSS REFERENCE TO RELATED APPLICATIONS

This application claims the benefit of U.S. Provisional Application Ser. No. 63/069,359 filed Aug. 24, 2020, the disclosure of which is hereby incorporated by reference in its entirety.

BACKGROUND OF THE INVENTION

The field of the disclosure relates generally to safety monitoring systems for electrical power systems operating in hazardous environments, and more particularly to systems, assemblies, and methods for corrosion monitoring of electrical enclosures located in a hazardous environment.

Electrical enclosures are used to enclose electrical components such as switches and circuit protectors inside. In hazardous industrial environments, such as mines, refineries and petroleum chemical plants, ignitable gas, vapors, dust or otherwise flammable substances are present in the ambient environment of electrical enclosures. In such environments, electrical enclosures are subject to corrosion that leads to cracking of the enclosures, which exposes the conductors inside the electrical enclosure to the outside environment and presents a potential safety hazard by posing ignition risks in the ambient environment in normal operating conditions or in electrical fault conditions, particularly to the extent that electrical arcing may occur in opening of switches and circuit protectors in use.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1A:
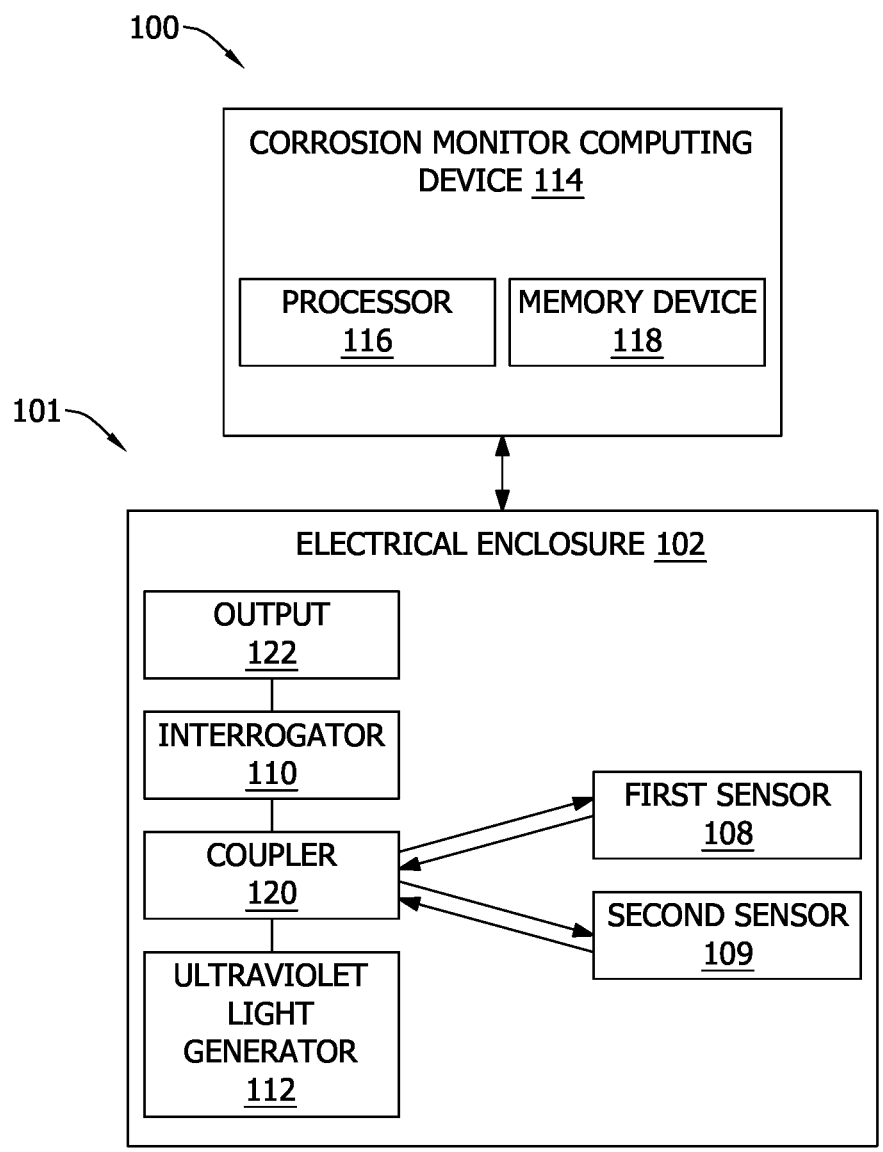
FIG. 1A is a block diagram of a corrosion monitoring system for an electrical enclosure according to an exemplary embodiment of the present disclosure.

Electrical power systems sometimes operate within hazardous environments presenting a risk of explosion via ignition of a surrounding gas or vapor dusts, fibers, or flyings. Such hazardous environments may arise, for example only, in petroleum refineries, petrochemical plants, grain silos, waste water and/or treatment facilities among other industrial facilities, wherein volatile conditions are produced in the ambient environment and present a heightened risk of fire or explosion. A temporary or sustained presence of airborne ignitable gas, ignitable vapors, ignitable dust or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are available to enclose or contain electrical products. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard 1203.

The National Electric Code (NEC) generally classifies hazardous locations by class and division. Class 1 locations are those in which flammable vapors and gases may be present. Class II locations are those in which combustible dust may be found. Class III locations are those that are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Class I, Zone 0, 1, or 2 representing locations in which flammable gases or vapors are or may be airborne in an amount sufficient to produce explosive or ignitable mixtures. As defined in the IEC, a Class I, Zone 0 location is a location in which ignitable concentrations of flammable gases or vapors are present continuously or for long periods of time. A Class I, Zone 1 location is a location in which ignitable concentrations of flammable gases or vapors are likely to exist because of repair or maintenance operations or because of leakage or possible release of ignitable concentrations of flammable gases or vapors, or is a location that is adjacent to a Class I, Zone 0 location from which ignitable concentrations of vapors could be communicated.

While a variety of electrical enclosures are known that are specifically constructed and fabricated to meet the requirements for hazardous location use and address ignition concerns, prolonged use of the electrical enclosures in corrosive environments can degrade their performance and compromise their effectiveness over time. Specifically, corrosion may lead to cracking that can expose energized conductors inside the enclosure to the ambient atmosphere, posing an ignition risk in hazardous location. Also, exposed conductors may themselves be subject to corrosive effects that can degrade the performance of the electrical power system, impair the operation of switches, or compromise the desired operation of circuit protection devices. In the cases of switches and circuit protectors that operate to disconnect devices under electrical load, arcing associated with the switches or circuit protectors presents substantial ignition concern, although abnormal operation of the system may lead to conductors operating at excessive temperatures that may also realize some risk of ignition in certain operating environments.

Of further concern, in a sealed electrical enclosure, internal corrosion would ordinarily not be expected, but the seals can be compromised and corrosion may still occur. When the enclosures are not opened for long periods of time, internal corrosion may generally be undetected for long periods of time. Also, problematic internal corrosion and development of cracks internal to the enclosure may not be apparent from an exterior inspection of the enclosure by electrical system overseers. Opening a large number of electrical enclosures for close inspection is possible but undesirably impractical in larger power systems wherein the electrical power system needs to be shut down in order to safely open the enclosures for inspection. Accordingly, it is desired that corrosion monitoring system and methods do not depend on persons and do not require opening of the enclosures to assess potentially problematic corrosion that presents the above ignition concerns in hazardous locations.

The systems, assemblies, and methods disclosed herein accordingly provide real-time corrosion monitoring of electrical enclosures installed in such hazardous environments. As such, possible safety hazards associated with corroded enclosures may be avoided. Further, preventive measures may be taken based on the corrosion level obtained during the monitoring. Corrosion monitoring disclosed herein is especially effective to identify potentially faulty electrical enclosures in an electrical system prior to actual ignition risks being presented that are attributable to corrosive effects.

Figure 1B:
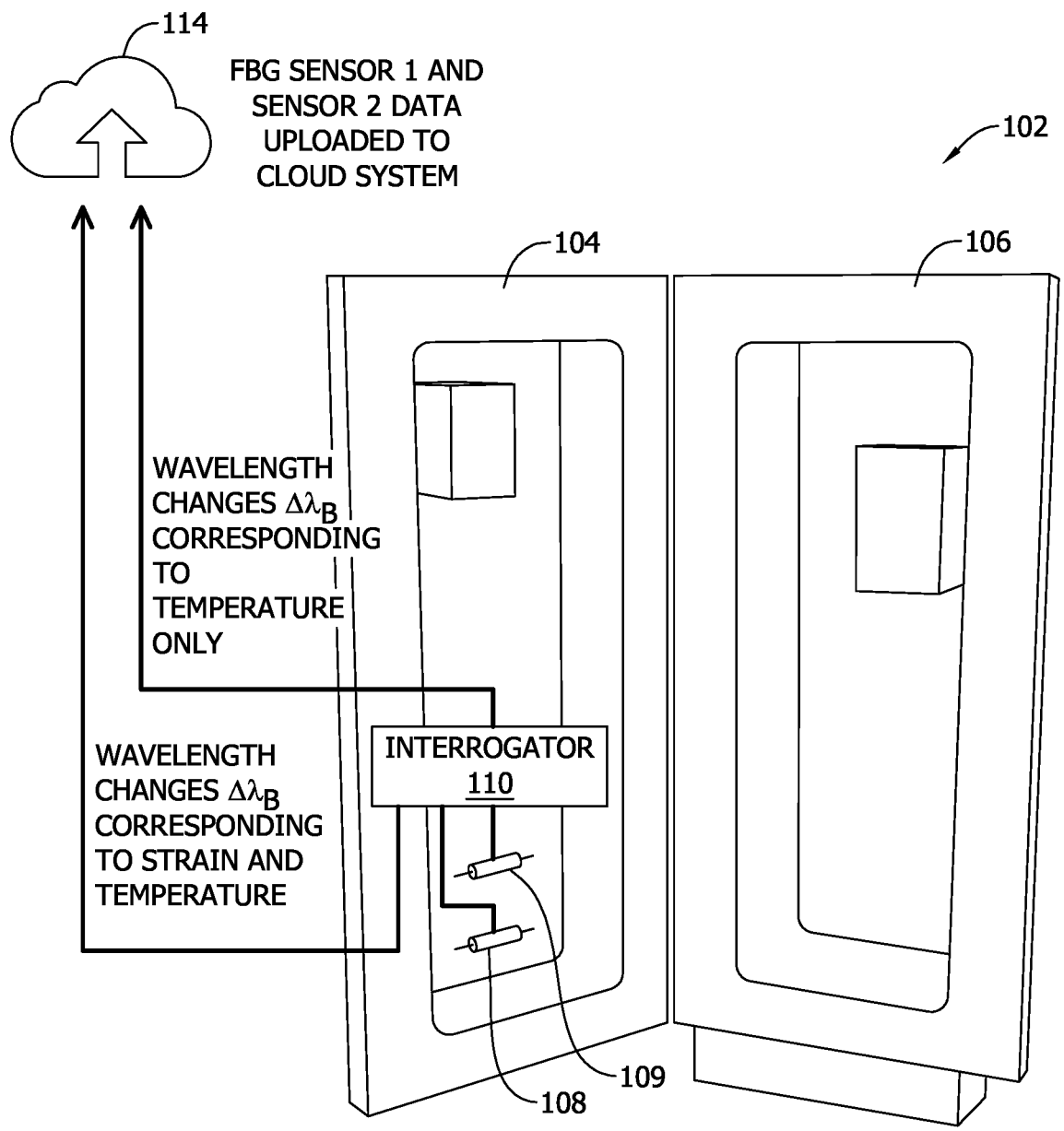
FIG. 1B is a schematic diagram of the corrosion monitoring system shown in FIG. 1A.

FIGS. 1A and 1B show an exemplary corrosion monitoring system 100. FIG. 1A is a block diagram of the system 100. FIG. 1B is a schematic diagram of the system 100.

The system 100 includes an electrical enclosure assembly 101. The electrical enclosure assembly 101 includes an electrical enclosure 102. The electrical enclosure is a metal housing or cabinet that contains electrical or electronic equipment and devices and their connections to the electrical power system via wires or cables and the like. Such an electrical enclosure serves to protect electrical devices inside and contain electrical energy inside the enclosure to present ignition risk to the ambient environment in a hazardous location. The electrical enclosure 102 may include a cover or door 104 and a body 106 (FIG. 1B) in the form of a housing, panel, or chassis familiar to those in the art. The cover 104 is coupled to the body 106 and opens and closes access to the interior of the body 106. The electrical enclosure 102 may enclose any electrical component or device, or combinations of components and devices, including but not limited to switches and circuit protectors discussed above. The electrical enclosure 102 is configured to be installed in a hazardous environment and has an appropriate rating therefor. The electrical enclosure 102 in some cases may be explosion proof. The electrical enclosure 102 may also be explosion protected and provide flameproof protection. The electrical enclosure 102 may be sealed to prevent corrosive material from entering into the electrical enclosure 102 and damaging the enclosed electrical components and devices. As discussed above, the enclosure 102 is subject to corrosion in certain environments.

The electrical enclosure assembly 101 further includes a first sensor 108 installed inside the enclosure 102 in any desired location. The first sensor 108 is used to measure corrosion-induced mechanical strain inside the electrical enclosure 102. The strain as disclosed herein is corrosion-related mechanical strain, which indicates mechanical degradation over time and is distinct from other sources of strain (e.g., heat) that may have a cumulative effect but not because of corrosion. The first sensor 108 may be a Fiber Bragg Grating (FBG) fiber optical sensor or an FBG sensor. In some embodiments, the first sensor 108 includes an FBG sensor and a pressure sensor, which senses the pressure inside the electrical enclosure. In other embodiments, the first sensor 108 includes an FBG sensor and a humidity sensor, which senses the humidity inside the electrical enclosure 102.

In some embodiments, the first sensor 108 is a sensor that is configured to measure corrosion-related physical characteristics other than strain. For example, the first sensor 108 is pressure sensor that senses the pressure inside the enclosure 102 and the system 100 monitors corrosion of the enclosure 102 through monitoring the pressure changes. In another example, the first sensor 108 is a humidity sensor that senses the humidity level inside the enclosure 102 and the system 100 monitors corrosion of the enclosure 102 through monitoring the humidity changes.

The electrical enclosure assembly 101 may further include a second sensor 109. The second sensor 109 is configured to measure the temperature inside the electrical enclosure 102. The second sensor 109 is positioned adjacent the first sensor 108. The second sensor 109 may also be an FBG optical sensor. In some embodiments, the second sensor 109 is a thermocouple.

In the exemplary embodiment, the system 100 further includes an optical interrogator or an interrogator 110 positioned inside the enclosure 102. An interrogator is an optoelectronic instrument that measures wavelength of ultraviolet (UV) light reflected by an FBG sensor. The interrogator 110 may also include a memory device (not shown) that stores data. The data stored in the interrogator 110 may be retrieved or read out by a computing device communicating with the interrogator 110. In operation, the interrogator 110 receives reflected light and is configured to analyze the embedded information within the reflected light. For example, the interrogator 110 is configured to measure the wavelength changes $\Delta\lambda$ in the UV light reflected by the sensor 108, 109. The interrogator 110 may be configured to compute the strain inside the electrical enclosure 102 based on the wavelength changes.

The system 100 further includes an UV light generator 112 configured to generate UV light. The UV light generator 112 is also positioned inside the electrical enclosure 102. The system 100 may further include a coupler 120. The coupler 120 is configured to manage incoming light from the UV light generator 112, as well as the reflected light from the first sensor 108 and/or the second sensor 109. The coupler 120 directs appropriate reflected signals to the interrogator 110. The coupler 120 is also positioned inside the electrical enclosure 102. In an alternative embodiment, the system 100 does not include a coupler 120, and light is directly transmitted from the UV light generator 112 to the first sensor 108 and/or the second sensor 109, and the reflected light is directly transmitted to the interrogator 110.

The system 100 may further include an output 122. The output 122 is a communication device. The output 122 may include a display. The information developed by the interrogator 110 is communicated to the output 122 through wired communication such as Ethernet, or through wireless communication such as Wi-Fi or through radio waves. The output 122 sends the information to other devices, through wired communication such as Ethernet, or through wireless communication such as Wi-Fi or through radio waves. The output 122 may be positioned inside the electrical enclosure 102 or outside the electrical enclosure 102.

As examples only, the UV light generator 112, the coupler 120, the interrogator 110, and the output 122 are depicted as separate devices in FIG. 1A. Alternatively, the UV light generator 112, the coupler 120, the interrogator 110, and the output 122 may be integrated as one device (see FIG. 1B), or into any combinations thereof.

The system 100 further includes a corrosion monitoring computing device 114. In an exemplary embodiment, the computing device 114 is a computing device located remotely from the electrical enclosure 102. In some embodiments, the computing device 114 is located inside the electrical enclosure 102. In other embodiments, the computing device 114 is located outside and proximate the electrical enclosure 102. In one embodiment, the computing device 114 is included in the interrogator 110.

In some embodiments, the corrosion monitoring computing device 114 includes a processor-based microcontroller including a processor 116 and a memory device 118 wherein executable instructions, commands, and control algorithms, as well as other data and information needed to satisfactorily operate the corrosion monitoring system 100, are stored. The memory device 118 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based."

The corrosion monitoring computing device 114 may be a server computing device. In some embodiments, the corrosion monitor computing device 114 is a user computing device. In one embodiment, the corrosion monitoring computing device 114 is cloud-based. The corrosion monitoring computing device may communicate with the interrogator 110 and/or the output 122 through wireless communication. Alternatively, the computing device 114 may communicate with the interrogator 110 and/or the output 122 through wired communication. The interrogator 110 and/or the output 122 may upload data stored in the memory device of the interrogator 110 to the computing device 114 periodically. In some embodiments, the interrogator 110 and/or the output 122 uploads the data in real time to the computing device 114.

The computing device 114 is configured to process the measured data sent from the interrogator 110 and/or the output 122. For example, the computing device 114 may compute strain inside the electrical enclosure based on the measured data. The computing device 114 may compare the computed strain with a predetermined level of strain. In one embodiment, the computing device 114 is configured to communicate with the interrogator 110. For example, the computing device 114 may send out an interrogating request to the interrogator 110.

In operation, the strain inside the electrical enclosure 102 is measured by the sensor 108, 109 and monitored by the corrosion monitoring computing device 114. The corrosion monitoring computing device 114 then assesses possible preventive maintenance needed for the electrical enclosure 102 based on the measured strain level.

Figure 2A:
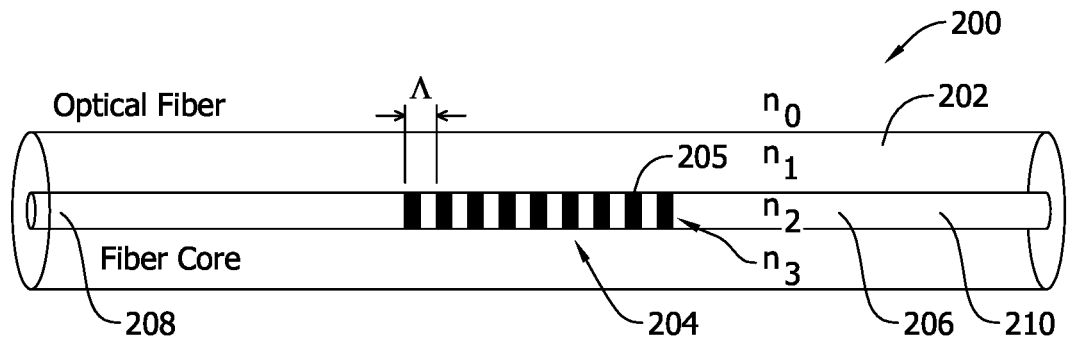
FIG. 2A shows an exemplary Fiber Bragg Grating (FBG) sensor for the corrosion monitoring system shown in FIGS. 1A and 1B.
Figure 2B:
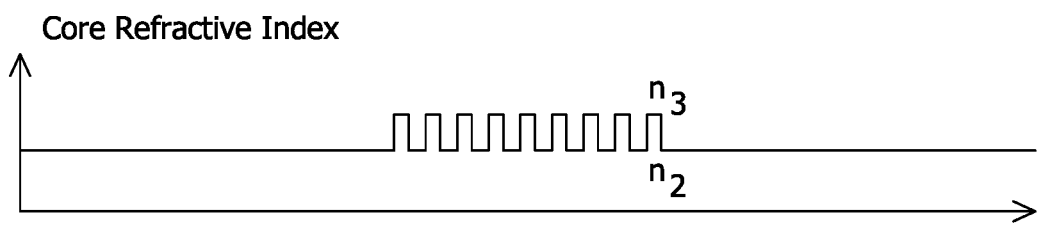
FIG. 2B is an exemplary plot of refractive indexes of the fiber core of the FBG sensor shown in FIG. 2A along the length of the optical fiber.
Figure 2C:
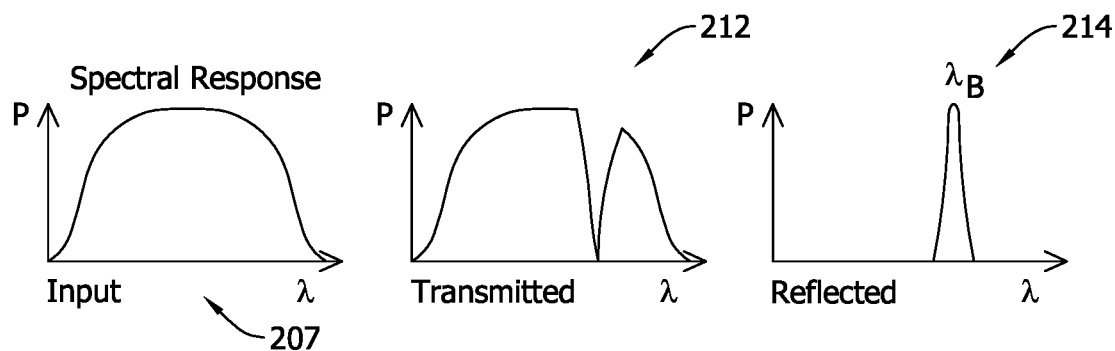
FIG. 2C shows exemplary spectral responses of the FBG sensor shown in FIG. 2A to ultraviolet (UV) light.

FIGS. 2A-2B show the operating mechanism of an exemplary FBG sensor 200. FIG. 2A shows an optical fiber 202 having an FBG 204. FIG. 2B shows refractive indexes of the fiber core 206 of the optical fiber 202 along the length of the optical fiber 202. FIG. 2C shows spectral responses of the optical fiber 202. The first sensor 108 and/or the second sensor 109 may an FBG sensor 200. FBG sensors are compact in size and light in weight. FBG sensors are immune to electromagnetic interference and can be safely used in highly explosive atmospheres. As such, the FBG sensor 200 is suited to be installed inside electrical enclosures 102 that are operated under hazardous environments.

The FBG sensor 200 includes an optical fiber 202 with FBG 204. The FBG 204 includes a pattern of reflection points 205, which were made by exposing the fiber core 206 to a periodic pattern of intense UV light. The reflection points 205 create spatially-periodic modulation of the refractive index n in the fiber core 206 of the optical fiber 202. A refractive index n of a material is a dimensionless number that describes how fast light travels through the material. The medium outside of the optical fiber 202, such as air, has a refractive index of $n_0$ (FIG. 2A). The refractive index of the optical fiber 202 outside the fiber core 206 is $n_1$ (FIG. 2A). Included with the FBG 204, the refractive index of the fiber core 206 changes between the refractive index $n_2$ of the fiber core 206 without the FBG 204 and the refractive index $n_3$ of the fiber core 206 at the reflection points 205 (FIG. 2B). As shown in FIG. 2C, light having a spectrum 207 is input into the optical core 206 at a first end 208. Part of the light is transmitted to the second end 210 of the optical fiber 202, having a spectrum 212. The remaining part of the light is reflected by the FBG 204, having a spectrum 214. The peak wavelength $\lambda_B$ of the reflective spectrum 214 is proportional to the distance $\Lambda$ between two adjacent reflection points 205, as expressed in the below equation:

$$\lambda_B = 2n_{eff}\Lambda, \qquad (1)$$

where $n_{eff}$ is the effective refractive index of the FBG 204. Wavelength changes $\Delta_{\lambda_B}$ in the wavelength $\lambda_B$ may be measured by the interrogator 110.

As shown in Eqn. (1), changes in the FBG 204 induce changes in the wavelength $\lambda_B$. For example, strain may affect the wavelength $\lambda_B$. Strain is the amount of deformation of an object under stress, which describes the magnitude of forces that cause deformation. Strain affects the distance $\Lambda$ between reflection points 205 and is defined as $d\Lambda/\Lambda$. The wavelength $\lambda_B$ is also affected by a temperature of the FBG 204.

After differentiating, Eqn. (1) becomes:

$$d\lambda_B = 2\Lambda dn_{eff} + 2n_{eff}d\Lambda. \qquad (2)$$

Dividing Eqn. (2) by Eqn. (1), it becomes:

$$\frac{d\lambda_B}{\lambda_B} = \frac{dn_{eff}}{n_{eff}} + \frac{d\Lambda}{\Lambda}, \quad (3)$$

where $$\frac{d\Lambda}{\Lambda}$$

is strain ε.

The changes in the effective refractive index $n_{eff}$ induced by strain e may be expressed as:

$$\frac{dn_{eff}}{n_{eff}} = -\frac{n_{eff}^2}{2(p_{12} - \vartheta(p_{11} + p_{12}))}\varepsilon, \quad (4)$$

where $p_{11}$ and $p_{12}$ are Pockel's coefficient of a strain-optical tensor, and $\vartheta$ is Poisson's ratio of the material of the optical fiber 202. Defining $$P = \frac{n_{eff}^2}{2(p_{12} - \vartheta(p_{11} + p_{12}))},$$

Eqn. (3) becomes:

$$\frac{d\lambda_B}{\lambda_B} = (1 - P)\varepsilon = K_\varepsilon\varepsilon, \quad (5)$$

where $K_\varepsilon$ is a strain sensitivity. Eqn. (5) is the equation between the FBG wavelength changes and strain without considering temperature changes.

To derive temperature sensing properties of FBG, Eqn. (1) is differentiated by temperature T and becomes:

$$d\lambda_B = 2\left(\Lambda\frac{dn_{eff}}{dT} + n_{eff}\frac{d\Lambda}{dT}\right)dT. \quad (6)$$

Dividing Eqn. (6) by Eqn. (1), it becomes:

$$\frac{d\lambda_B}{\lambda_B} = \left(\frac{1}{n_{eff}}\frac{dn_{eff}}{dT} + \frac{1}{\Lambda}\frac{d\Lambda}{dT}\right)dT. \quad (7)$$

Let $$\frac{1}{n_{eff}}\frac{dn_{eff}}{dT} = \zeta \text{ and } \frac{1}{\Lambda}\frac{d\Lambda}{dT} = \alpha,$$

where ζ is a thermal-optical tensor and α is a thermal expansion coefficient, and Eqn. (7) becomes:

$$\frac{d\lambda_B}{\lambda_B} = (\alpha + \zeta)dT = K_T dT. \quad (8)$$

Because FBGs are made from different fabrication techniques and have different sensing properties, the strain and temperature sensitivity coefficients of an FBG are determined by calibration before it is used as a strain or temperature sensor, especially for packaged FBGs.

If the coupling between strain and temperature is neglected, the sensing principle of the first sensor 108, which senses both the strain and temperature is given as:

$$\frac{\Delta\lambda_B}{\lambda_B} = K_\varepsilon \varepsilon + K_T \Delta T. \quad (9)$$

Here, $K_T$ is a thermal sensitivity coefficient, and is depicted as:

$$K_T = \alpha + \zeta. \quad (10)$$

The thermal expansion coefficient α is that of the host material, i.e., the electrical enclosure 102, not the optical fiber because once a bare FBG is installed on the host matrix, the FBG deforms as the host matrix under temperature changes. Strain is then calculated from Eqn. (9) as:

$$\varepsilon = \frac{\Delta\lambda_B}{\lambda_B K_\varepsilon} - \frac{K_T \Delta T}{K_\varepsilon}, \quad (11)$$

where ΔT is the temperature change of the FBG 204.

As shown in Eqn. (11), wavelength changes $\Delta\lambda_B$ and temperature changes ΔT may be used to measure strain ε. The base wavelength $\lambda_B$ at a base temperature, the strain sensitivity $K_\varepsilon$, the thermal sensitivity $K_T$ of the FBG 204 may be provided by the manufacturer of the FBG sensor 200, or may be calibrated before use.

Referring back to FIG. 1B, the system 100 includes the first sensor 108 and the second sensor 109. In the exemplary embodiment, the first and second sensors 108, 109 are FBG sensors 200. The first sensor 108 is sensitive to the strain ε and the temperature T. The second sensor 109 may be sensitive to the temperature T only. The changes $\Delta\lambda_B$ in wavelength of UV light reflected by the FBG 204 of the second sensor 109 are used to measure the temperature changes ΔT.

In operation, the interrogator 110 detects a change $\Delta\lambda_B$ in wavelength of UV light reflected by the first sensor 109, which is a function of strain and temperature. The interrogator 110 detects wavelength changes $\Delta\lambda_B$ due to temperature changes only from the second sensor 109. The interrogator 110 sends the measured data including the wavelength changes $\Delta\lambda_B$ in first and second sensors 108, 109 to the corrosion monitoring computing device 114. The computing device 114 may compute strain inside the electrical enclosure 102 based on the measured data and the relationship among strain, temperature, and wavelength changes as described above. Based on the computed strain, the computing device 114 determines the level of corrosion and may prompt preventive measures based on the level of corrosion.

In some embodiments, the computing device 114 determines whether the electrical enclosure 102 has an air leak because the level of strain or corrosion reflects the level of deformation of the electrical enclosure 102 that affects the air-tightness of the electrical enclosure 102. In other embodiments, the computing device 114 computes a remaining life of the electrical enclosure 102 based on the level of corrosion. For example, a cross correlation between the level of corrosion and the age of the same type of the electrical enclosures 102 may be derived, based on data collected from the electrical enclosure 102 installed in the field. The remaining life of the electrical enclosure 102 is then computed based on the cross correlation. The remaining life may be reported to electrical power system administrators who may proactively repair or replace enclosures prior to the point where the enclosures pose ignition risks.

In other embodiments, the computing device 114 may provide maintenance alerts to electrical power system administrators including excess strain for particular enclosures based on the measured level of corrosion. A specific recommended maintenance policy may be communicated to electrical power system administrators that include a schedule of maintenance based upon the detected level of corrosion on an enclosure-by-enclosure basis.

Figure 3:
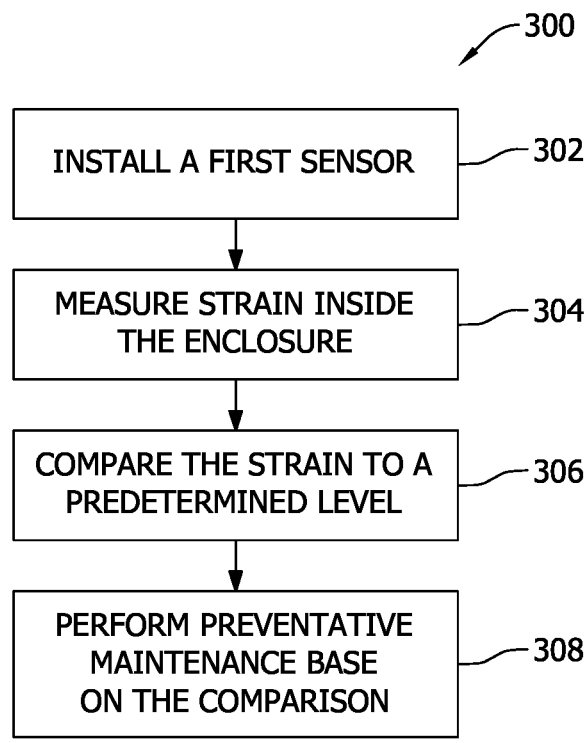
FIG. 3 is an exemplary flow chart of an exemplary process of monitoring corrosion in an electrical enclosure.

FIG. 3 is a flowchart of an exemplary method 300 of monitoring corrosion in electrical enclosures. The method 300 includes installing 302 a first sensor inside the electrical enclosure at a location that is susceptible to corrosion such as any of the sensors described above. The method 300 further includes measuring 304 strain inside the electrical enclosure as described above. In some embodiments, the measured strain data is uploaded to a corrosion monitoring computing device. The corrosion monitoring computing device may be located remotely from the first sensor, such as in the cloud. The measured data may be uploaded periodically. In some embodiments, the measured data may be uploaded in real time, where the data is uploaded immediately after the measurements. The measured strain is then compared 306 with a predetermined threshold. The predetermined threshold is a level of strain above which the electrical enclosure is not safe to be in use and needs to be replaced. The predetermined threshold is contemplated to be different for various electrical enclosures located in different environments. Preventive maintenance recommendation is performed 308 based on the comparisons made. If the level of strain is above the predetermined threshold, preventive maintenance is recommended to be performed. If the level of strain is below the predetermined threshold, corrosion monitoring is continued.

Figure 4:
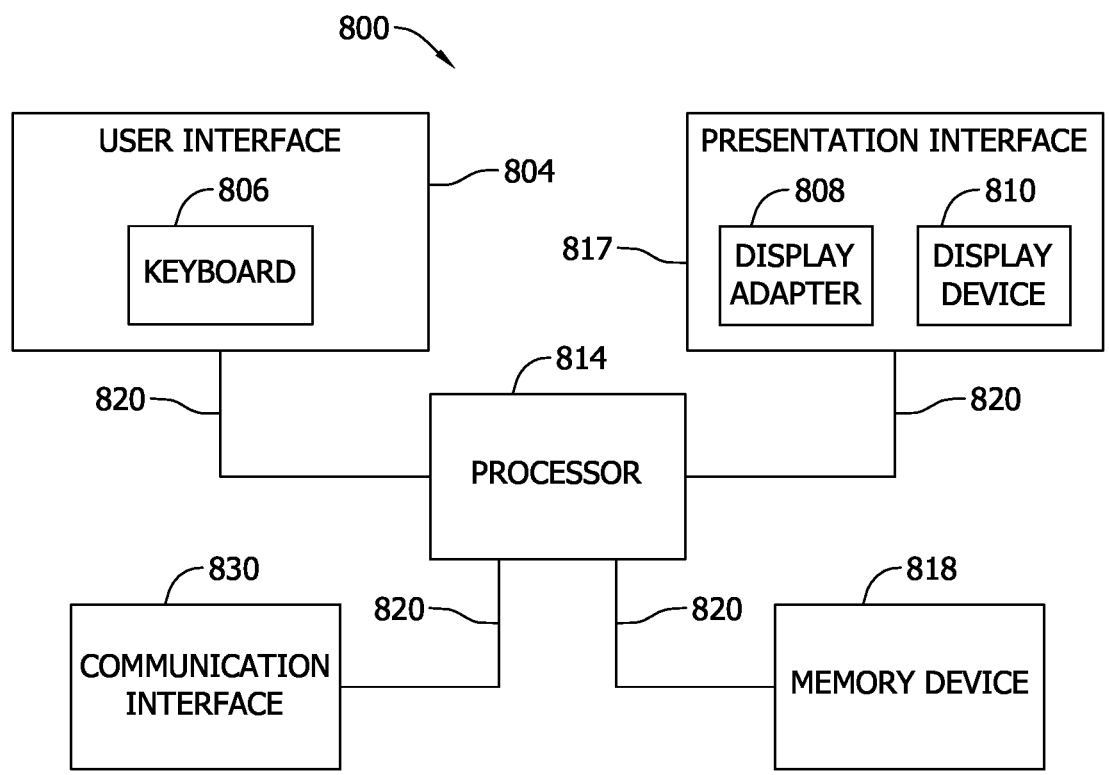
FIG. 4 is a block diagram of an exemplary user computing device.

The corrosion monitoring computing device 114 described herein may be any suitable user computing device 800 and software implemented therein. FIG. 4 is a block diagram of an exemplary computing device 800. In the exemplary embodiment, the computing device 800 includes a user interface 804 that receives at least one input from a user. The user interface 804 may include a keyboard 806 that enables the user to input pertinent information. The user interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computing device 800 includes a presentation interface 817 that presents information, such as input events and/or validation results, to the user. The presentation interface 817 may also include a display adapter 808 that is coupled to at least one display device 810. More specifically, in the exemplary embodiment, the display device 810 may be a visual display device, such as a cathode ray tube (CRT), a liquid crystal display (LCD), a light-emitting diode (LED) display, and/or an "electronic ink" display. Alternatively, the presentation interface 817 may include an audio output device (e.g., an audio adapter and/or a speaker) and/or a printer.

The computing device 800 also includes a processor 814 and a memory device 818. The processor 814 is coupled to the user interface 804, the presentation interface 817, and the memory device 818 via a system bus 820. In the exemplary embodiment, the processor 814 communicates with the user, such as by prompting the user via the presentation interface 817 and/or by receiving user inputs via the user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, the memory device 818 includes one or more devices that enable information, such as executable instructions and/or other data, to be stored and retrieved. Moreover, the memory device 818 includes one or more computer readable media, such as, without limitation, dynamic random access memory (DRAM), static random access memory (SRAM), a solid state disk, and/or a hard disk. In the exemplary embodiment, the memory device 818 stores, without limitation, application source code, application object code, configuration data, additional input events, application states, assertion statements, validation results, and/or any other type of data. The computing device 800, in the exemplary embodiment, may also include a communication interface 830 that is coupled to the processor 814 via the system bus 820. Moreover, the communication interface 830 is communicatively coupled to data acquisition devices.

In the exemplary embodiment, the processor 814 may be programmed by encoding an operation using one or more executable instructions and providing the executable instructions in the memory device 818. In the exemplary embodiment, the processor 814 is programmed to select a plurality of measurements that are received from data acquisition devices.

In operation, a computer executes computer-executable instructions embodied in one or more computer-executable components stored on one or more computer-readable media to implement aspects of the disclosure described and/or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 5:
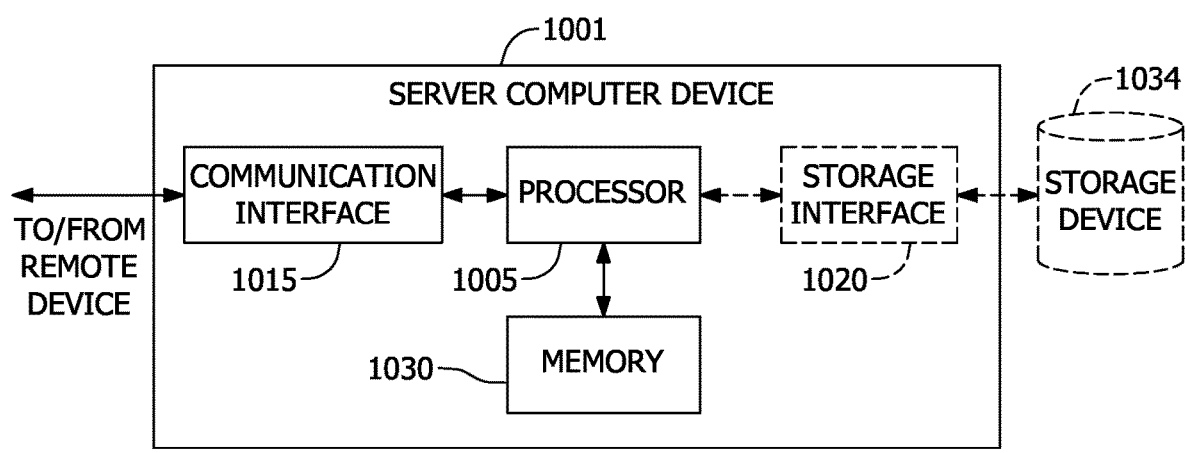
FIG. 5 is a block diagram of an exemplary server computing device.

FIG. 5 illustrates an exemplary configuration of a server computer device 1001 such as the corrosion monitoring computing device 114. The server computer device 1001 also includes a processor 1005 for executing instructions. Instructions may be stored in a memory area 1030, for example. The processor 1005 may include one or more processing units (e.g., in a multi-core configuration).

The processor 1005 is operatively coupled to a communication interface 1015 such that server computer device 1001 is capable of communicating with a remote device such as the corrosion monitoring computing device 114, the interrogator 110, or another server computer device 1001. For example, communication interface 1015 may receive data from the corrosion monitoring computing device 114 and the interrogator 110, via the Internet.

The processor 1005 may also be operatively coupled to a storage device 1034. The storage device 1034 is any computer-operated hardware suitable for storing and/or retrieving data, such as, but not limited to, wavelength changes, temperatures, and strain. In some embodiments, the storage device 1034 is integrated in the server computer device 1001. For example, the server computer device 1001 may include one or more hard disk drives as the storage device 1034. In other embodiments, the storage device 1034 is external to the server computer device 1001 and may be accessed by a plurality of server computer devices 1001. For example, the storage device 1034 may include multiple storage units such as hard disks and/or solid state disks in a redundant array of inexpensive disks (RAID) configuration. The storage device 1034 may include a storage area network (SAN) and/or a network attached storage (NAS) system.

In some embodiments, the processor 1005 is operatively coupled to the storage device 1034 via a storage interface 1020. The storage interface 1020 is any component capable of providing the processor 1005 with access to the storage device 1034. The storage interface 1020 may include, for example, an Advanced Technology Attachment (ΔTA) adapter, a Serial ΔTA (SATA) adapter, a Small Computer System Interface (SCSI) adapter, a RAID controller, a SAN adapter, a network adapter, and/or any component providing the processor 1005 with access to the storage device 1034.

At least one technical effect of the systems and methods described herein includes (a) corrosion monitoring of electrical enclosures operated in a hazardous environment; (b) real-time corrosion monitoring; (c) corrosion monitoring using FBG sensor that is suited for a hazardous environment; and (d) preventive measures to protect the electrical enclosures and electrical power systems based on the level of corrosion obtained during corrosion monitoring.

The benefits and advantages of the inventive concepts are now believed to have been amply illustrated in relation to the exemplary embodiments disclosed.

An embodiment of a method of monitoring corrosion of an electrical enclosure in a hazardous environment is provided. The method is implemented with at least one computing device in communication with at least one FBG optical sensor reflecting UV light in the electrical enclosure. The method includes measuring wavelength changes of UV light reflected by the at least one sensor, wherein the wavelength changes are a function of corrosion-related strain in the electrical enclosure. The method also includes computing, by the at least one computing device, the corrosion-related strain in the electrical enclosure based on the measured wavelength changes. The method further includes comparing, by the at least one computing device, the computed corrosion-related strain with a predetermined threshold, and recommending preventive corrosion-related maintenance based on the comparison.

Optionally, the at least one sensor includes a first sensor and a second sensor, and measuring wavelength changes further includes measuring wavelength changes of UV light reflected by the first sensor and wavelength changes of UV light reflected by the second sensor. The first sensor is configured to be sensitive to the corrosion-related strain in the electrical enclosure and a temperature inside the electrical enclosure, and the second sensor is sensitive to the temperature inside the electrical enclosure and insensitive to the corrosion-related strain in the electrical enclosure. The method further includes measuring at a measuring time point a wavelength change from a reference time point of the UV light reflected by the first sensor, and measuring at the measuring time point a wavelength change from the reference time point of UV light reflected by the second sensor. The method also includes computing a temperature change inside the electrical enclosure between the measuring time point and the reference time point based on the wavelength change of the UV light reflected by the second sensor. In addition, the method includes computing the corrosion-related strain in the electrical enclosure at the measuring time point based on the wavelength change and the temperature change. Recommending preventive maintenance further includes computing a cross-correlation between corrosion-related strain and life of the electrical enclosure, and estimating a remaining life of the electrical enclosure based on the computed cross-correlation. Recommending preventive maintenance further includes detecting air leak inside the electrical enclosure based on the corrosion-related strain. Recommending preventive maintenance further includes if the measured corrosion-related strain exceeds the predetermined threshold, generating an alert.

An embodiment of a corrosion monitoring system of an electrical enclosure in a hazardous environment is provided. The system includes at least one sensor and a corrosion monitoring computing device. The at least one sensor is installed inside the electrical enclosure, wherein the at least one sensor is an FBG optical sensor and is configured to cause wavelength changes in UV light reflected by the at least one sensor, and the wavelength changes are a function of corrosion-related strain in the electrical enclosure. The corrosion monitoring computing device includes at least one processor in communication with at least one memory device, the corrosion monitoring computing device located remotely from the at least one sensor and programmed to receive a computed corrosion-related strain in the electrical enclosure based on the wavelength changes. The computing device is further programmed to compare the computed corrosion-related strain with a predetermined threshold, and recommend preventive maintenance based on the comparison.

Optionally, the at least one sensor includes a first sensor and a second sensor. The first sensor is sensitive to the corrosion-related strain in the electrical enclosure and a temperature inside the electrical enclosure, and the second sensor is sensitive to the temperature inside the electrical enclosure and insensitive to the corrosion-related strain in the electrical enclosure. The corrosion monitoring computing device is further programmed to compute the corrosion-related strain in the electrical enclosure based on wavelength changes of the UV light reflected by the first sensor and wavelength changes of UV light reflected by the second sensor. The corrosion monitoring computing device is further programmed to compute a cross-correlation between corrosion-related strain and life of the electrical enclosure, and estimate a remaining life of the electrical enclosure based on the computed cross-correlation. The corrosion monitoring computing device is further programmed to detect an air leak inside the electrical enclosure based on the corrosion-related strain. The corrosion monitoring computing device is further programmed to generate an alert if the measured corrosion-related strain exceeds the predetermined threshold.

An embodiment of an electrical enclosure assembly for a hazardous environment is provided. The electrical enclosure assembly includes an electrical enclosure rated for use in the hazardous environment and at least one sensor. The at least one sensor is installed inside the electrical enclosure, wherein the at least one sensor is an FBG optical sensor and is configured to cause wavelength changes in UV light reflected by the at least one sensor, and the wavelength changes are a function of corrosion-related strain in the electrical enclosure.

Optionally, the at least one sensor includes a first sensor and a second sensor. The first sensor is sensitive to the corrosion-related strain in the electrical enclosure and a temperature inside the electrical enclosure, and the second sensor is sensitive to the temperature inside the electrical enclosure and insensitive to the corrosion-related strain in the electrical enclosure. The corrosion-related strain in the electrical enclosure is computed according to $$\varepsilon = \frac{\Delta\lambda_B}{\lambda_B K_\varepsilon} - \frac{K_T \Delta T}{K_\varepsilon},$$

wherein $\varepsilon$ is the corrosion-related strain, $\Delta\lambda_B$ is the wavelength change of UV light reflected by the first sensor, $K_\varepsilon$ is a strain sensitivity, $K_T$ is a thermal sensitivity, and $\Delta T$ is a temperature change inside the electrical enclosure measured using wavelength changes of UV light reflected by the second sensor. The electrical enclosure assembly further includes an interrogator installed inside the electrical enclosure and configured to measure the wavelength changes of the UV light reflected by the at least one sensor. The at least one sensor includes a first sensor and a second sensor, and the interrogator is further configured to measure wavelength changes of UV light reflected by the first sensor and wavelength changes of UV light reflected by the second sensor. The electrical enclosure assembly further includes a corrosion monitoring computing device, where the corrosion monitoring computing device includes at least one processor in communication with at least one memory device. The corrosion monitoring computing device is in communication with the at least one sensor and programmed to receive a computed corrosion-related strain in the electrical enclosure based on the wavelength changes, compare the computed corrosion-related strain with a predetermined threshold, and recommend preventive maintenance based on the comparison.

Another embodiment of a corrosion monitoring system of an electrical enclosure in a hazardous environment is disclosed. The system includes at least one sensor installed inside the electrical enclosure and a corrosion monitoring computing device. The at least one sensor is configured to measure a corrosion-related physical characteristic in the electrical enclosure. The computing device includes at least one processor in communication with at least one memory device, and is located remotely from the at least one sensor. The at least one processor is programmed to receive the corrosion-related physical characteristic in the electrical enclosure, compare the corrosion-related physical characteristic with a predetermined threshold, and recommend preventive maintenance based on the comparison.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate particular types of fuses or the needs of particular installations, while still providing the needed performance and functionality of the fuses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring corrosion of an electrical enclosure in a hazardous environment, the method implemented with at least one computing device in communication with at least one Fiber Bragg Grating (FBG) optical sensor reflecting ultraviolet (UV) light in the electrical enclosure, the method comprising:
    measuring, by an interrogator mounted inside the electrical enclosure comprising an electrical device, wavelength changes of UV light reflected by the at least one FBG optical sensor mounted inside the electrical enclosure, wherein the wavelength changes are a function of corrosion-related strain in the electrical enclosure;
    receiving, by the at least one computing device, the measured wavelength changes from the interrogator;
    computing, by the at least one computing device, the corrosion-related strain in the electrical enclosure based on the measured wavelength changes;
    comparing, by the at least one computing device, the computed corrosion-related strain with a predetermined threshold; and
    recommending preventive corrosion-related maintenance based on the comparison.

2. The method of claim 1, wherein the at least one FBG optical sensor comprises a first FBG optical sensor and a second FBG optical sensor, and wherein measuring the wavelength changes further comprises measuring first wavelength changes of UV light reflected by the first FBG optical sensor and second wavelength changes of UV light reflected by the second FBG optical sensor.

3. The method of claim 2, wherein the first FBG optical sensor is configured to be sensitive to the corrosion-related strain in the electrical enclosure and a temperature inside the electrical enclosure, and the second FBG optical sensor is sensitive to the temperature inside the electrical enclosure and insensitive to the corrosion-related strain in the electrical enclosure.

4. The method of claim 2, further comprising:
    measuring at a measuring time point a wavelength change from a reference time point of the UV light reflected by the first FBG optical sensor;
    measuring at the measuring time point a wavelength change from the reference time point of UV light reflected by the second FBG optical sensor;
    computing a temperature change inside the electrical enclosure between the measuring time point and the reference time point based on the wavelength change of the UV light reflected by the second FBG optical sensor; and computing the corrosion-related strain in the electrical enclosure at the measuring time point based on the wavelength change and the temperature change.

5. The method of claim 1, wherein recommending preventive maintenance further comprises:

computing a cross-correlation between corrosion-related strain and life of the electrical enclosure; and estimating a remaining life of the electrical enclosure based on the computed cross-correlation.

6. The method of claim 1, wherein recommending preventive maintenance further comprises:

detecting air leak inside the electrical enclosure based on the corrosion-related strain.

7. The method of claim 1, wherein recommending preventive maintenance further comprises:

if the measured corrosion-related strain exceeds the predetermined threshold, generating an alert.

8. A corrosion monitoring system of an electrical enclosure in a hazardous environment, comprising:

at least one sensor installed inside the electrical enclosure comprising an electrical device, wherein the at least one sensor is a Fiber Bragg Grating (FBG) optical sensor and is configured to cause wavelength changes in ultraviolet (UV) light reflected by the at least one sensor;

an interrogator mounted inside the electrical enclosure, wherein the interrogator is configured to:

measure the wavelength changes of the UV light reflected by the at least one sensor, determine a corrosion-related strain in the electrical enclosure based on the wavelength changes, wherein the wavelength changes are a function of corrosion-related strain in the electrical enclosure; and a corrosion monitoring computing device comprising at least one processor in communication with at least one memory device, the corrosion monitoring computing device located remotely from the at least one sensor and programmed to:

receive the computed corrosion-related strain in the electrical enclosure based on the wavelength changes;

compare the computed corrosion-related strain with a predetermined threshold; and recommend preventive maintenance based on the comparison.

9. The system of claim 8, wherein the at least one sensor comprises a first sensor and a second sensor.

10. The system of claim 9, wherein the first sensor is sensitive to the corrosion-related strain in the electrical enclosure and a temperature inside the electrical enclosure, and the second sensor is sensitive to the temperature inside the electrical enclosure and insensitive to the corrosion-related strain in the electrical enclosure.

11. The system of claim 10, wherein the corrosion monitoring computing device is further programmed to:

compute the corrosion-related strain in the electrical enclosure based on first wavelength changes of the UV light reflected by the first sensor and second wavelength changes of the UV light reflected by the second sensor.

12. The system of claim 8, wherein the corrosion monitoring computing device is further programmed to:

compute a cross-correlation between the corrosion-related strain and life of the electrical enclosure; and estimate a remaining life of the electrical enclosure based on the computed cross-correlation.

13. The system of claim 8, wherein the corrosion monitoring computing device is further programmed to:

detect an air leak inside the electrical enclosure based on the corrosion-related strain.

14. The system of claim 8, wherein the corrosion monitoring computing device is further programmed to:

generate an alert if the measured corrosion-related strain exceeds the predetermined threshold.

15. An electrical enclosure assembly for a hazardous environment, comprising:

an electrical enclosure rated for use in the hazardous environment, wherein the electrical enclosure comprises an electrical device installed inside;

at least one sensor installed inside the electrical enclosure, wherein the at least one sensor is a Fiber Bragg Grating (FBG) optical sensor and is configured to cause wavelength changes in ultraviolet (UV) light reflected by the at least one sensor; and an interrogator installed inside the electrical enclosure and configured to measure the wavelength changes of the UV light reflected by the at least one sensor, wherein the wavelength changes are a function of corrosion-related strain in the electrical enclosure.

16. The electrical enclosure assembly of claim 15, wherein the at least one sensor comprises a first sensor and a second sensor, and the first sensor is sensitive to the corrosion-related strain in the electrical enclosure and a temperature inside the electrical enclosure, and wherein the second sensor is sensitive to the temperature inside the electrical enclosure and insensitive to the corrosion-related strain in the electrical enclosure.

17. The electrical enclosure assembly of claim 16, wherein the corrosion-related strain in the electrical enclosure is computed according to:

$$\varepsilon = \frac{\Delta \lambda_B}{\lambda_B K_\varepsilon} - \frac{K_T \Delta T}{K_\varepsilon},$$

wherein $\varepsilon$ is the corrosion-related strain, $\Delta \lambda_B$ is a first wavelength change of UV light reflected by the first sensor, $K_\varepsilon$ is a strain sensitivity, $K_T$ is a thermal sensitivity, and $\Delta T$ is a temperature change inside the electrical enclosure measured using a second wavelength change of the UV light reflected by the second sensor.

18. The electrical enclosure assembly of claim 15, wherein the at least one sensor comprises a first sensor and a second sensor, and wherein the interrogator is further configured to measure first wavelength changes of UV light reflected by the first sensor and second wavelength changes of UV light reflected by the second sensor.

19. The electrical enclosure assembly of claim 15, further comprising a corrosion monitoring computing device, wherein the corrosion monitoring computing device comprises at least one processor in communication with at least one memory device, the corrosion monitoring computing device in communication with the at least one sensor and programmed to:

receive a computed corrosion-related strain in the electrical enclosure based on the wavelength changes;

compare the computed corrosion-related strain with a predetermined threshold; and recommend preventive maintenance based on the comparison.

\* \* \* \* \*